(12) United States Patent
Cam-Winget et al.

(10) Patent No.: US 10,320,613 B1
(45) Date of Patent: Jun. 11, 2019

(54) CONFIGURING CONTEXTUALLY AWARE IOT POLICIES

(71) Applicant: Cisco Technology, Inc., San Jose, CA (US)

(72) Inventors: Nancy Cam-Winget, Mountain View, CA (US); Dieter Derek Weber, Camden, ME (US); Srikanth Ranganamyna, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 15/057,283

(22) Filed: Mar. 1, 2016

Related U.S. Application Data

(60) Provisional application No. 62/203,619, filed on Aug. 11, 2015.

(51) Int. Cl.
*H04L 12/24* (2006.01)
*H04L 12/873* (2013.01)
*H04L 12/751* (2013.01)

(52) U.S. Cl.
CPC .......... *H04L 41/0893* (2013.01); *H04L 41/12* (2013.01); *H04L 45/02* (2013.01); *H04L 47/527* (2013.01)

(58) Field of Classification Search
None
See application file for complete search history.

(56) References Cited

U.S. PATENT DOCUMENTS

| | | | |
|---|---|---|---|
| 4,787,035 A * | 11/1988 | Bourne | G06F 9/45508 700/247 |
| 7,818,780 B1 * | 10/2010 | Salmi | H04L 45/56 709/242 |
| 7,950,044 B2 | 5/2011 | Brandt et al. | |
| 8,040,902 B1 | 10/2011 | Raghunathan et al. | |
| 8,132,225 B2 | 3/2012 | Chand et al. | |
| 8,707,252 B1 * | 4/2014 | Alexeev | G06F 8/427 717/104 |
| 8,839,349 B2 | 9/2014 | Pearcy et al. | |
| 9,083,749 B1 | 7/2015 | Roth et al. | |
| 9,419,856 B1 * | 8/2016 | Chawla | H04L 41/0866 |
| 2002/0157020 A1 * | 10/2002 | Royer | H04L 63/1441 726/11 |
| 2003/0051008 A1 * | 3/2003 | Gorthy | H04L 41/0226 709/220 |

(Continued)

OTHER PUBLICATIONS

Anonymous: "Firewall Builder", Jan. 1, 2004, Retrieved from the Internet: URL: https://ww.dfn-cert.de/dokumente//workshop/2004/dfncert-ws2004-f6.pdf, pp. 2-3, 6-10, and 21.

(Continued)

*Primary Examiner* — Gregory B Sefcheck
*Assistant Examiner* — Jenkey Van
(74) *Attorney, Agent, or Firm* — Behmke Innovation Group LLC; James Behmke; Stephen D. LeBarron

(57) ABSTRACT

In one embodiment, a device in a network loads a selectable lexicon. The device receives a command that uses the loaded lexicon. The device interprets the command using the loaded lexicon. The device generates a configuration for one or more network nodes in the network based on the interpreted command. The device causes the one or more network nodes to implement the configuration.

18 Claims, 7 Drawing Sheets

(56) References Cited

U.S. PATENT DOCUMENTS

| | | | | |
|---|---|---|---|---|
| 2004/0041833 | A1* | 3/2004 | Dikhit | H04L 41/12 |
| | | | | 715/738 |
| 2004/0088425 | A1* | 5/2004 | Rubinstein | H04L 63/20 |
| | | | | 709/230 |
| 2004/0162996 | A1 | 8/2004 | Wallace et al. | |
| 2006/0047785 | A1* | 3/2006 | Wang | H04L 41/08 |
| | | | | 709/220 |
| 2010/0024031 | A1* | 1/2010 | Shribman | G06F 9/45512 |
| | | | | 726/18 |
| 2010/0043067 | A1* | 2/2010 | Varadhan | H04L 12/18 |
| | | | | 726/13 |
| 2013/0311166 | A1* | 11/2013 | Yanpolsky | G06F 17/30654 |
| | | | | 704/2 |
| 2016/0212137 | A1* | 7/2016 | Pottier | H04L 63/101 |
| 2016/0366136 | A1* | 12/2016 | Heldt-Sheller | H04L 63/10 |
| 2017/0012818 | A1* | 1/2017 | Suragi Math | H04L 41/085 |
| 2017/0099176 | A1* | 4/2017 | Jain | H04L 41/046 |

OTHER PUBLICATIONS

Mohan, R. et al.: "An editor for adaptive XML-based policy management of IPsec", Computer Security Applications Conference, 2003, Proceedings, 19th Annual Dec. 8-12, 2003, Piscataway, NJ, USA, IEEE, Dec. 8, 2003, pp. 276-285.
International Search Report dated Oct. 14, 2016 in connection with PCT/US2016/045077.
Cisco Identity Services Engine—Reduces the Attach Surface by Controliing Access; Cisco; 1 page; 2014.

* cited by examiner

CONFIGURING CONTEXTUALLY AWARE IOT POLICIES

RELATED APPLICATIONS

This application claims priority to U.S. Provisional Application No. 62/203,619, filed Aug. 11, 2015, entitled "CONFIGURING CONTEXTUALLY AWARE IoT POLICIES," by Cam-Winget et al., the contents of which are hereby incorporated by reference.

TECHNICAL FIELD

The present disclosure relates generally to computer networks, and, more particularly, to admission control for low power and lossy networks (LLNs), such as an Internet of Things (IoT) network.

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also is affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

Traditionally, information technology (IT) professionals have managed network security access controls by leveraging their knowledge of the network and supporting networking devices (e.g., routers, etc.). However, in the case of LLNs, the primary function of these devices may be unrelated to networking. For example, a typical deployment may include sensors configured to monitor non-network operations (e.g., operations of an oil and gas production facility, an automated factory, etc.). Thus, operations technology (OT) personnel that would normally interact with these devices (e.g., a factory worker, etc.) may not have the knowledge or expertise to configure network security mechanisms for such devices in an IoT deployment.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network loads a selectable lexicon. The device receives a command that uses the loaded lexicon. The device interprets the command using the loaded lexicon. The device generates a configuration for one or more network nodes in the network based on the interpreted command. The device causes the one or more network nodes to implement the configuration.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
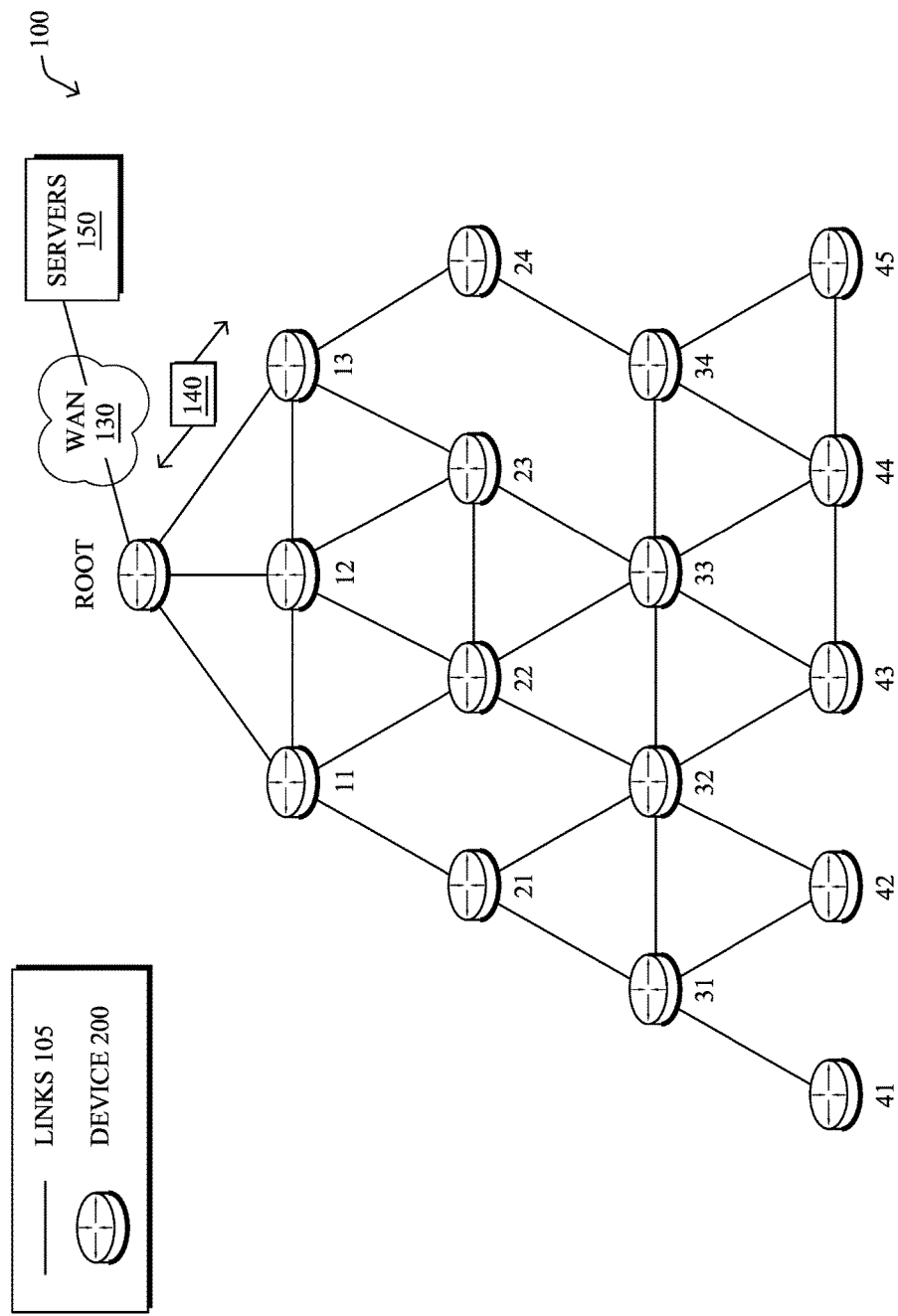
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, programmable logic controllers, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
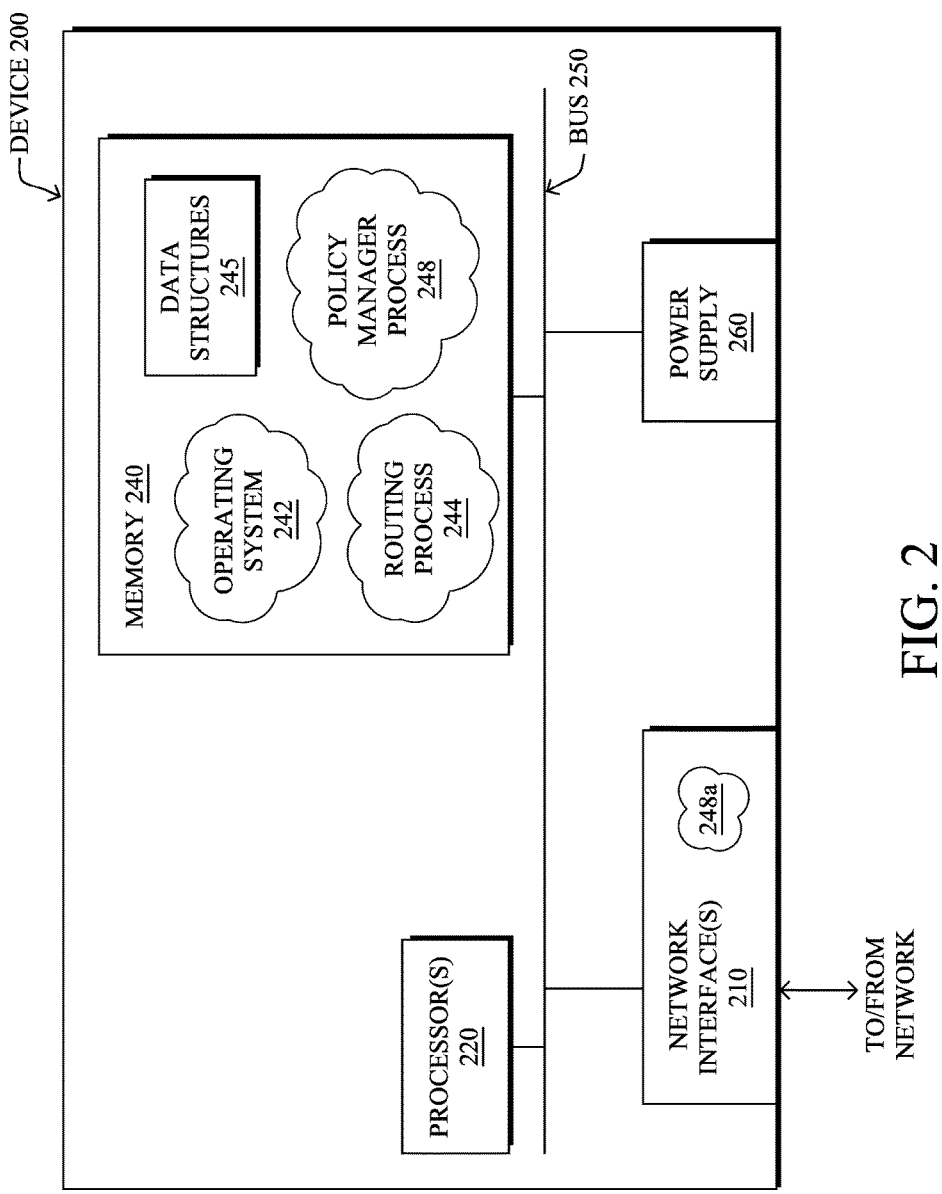
FIG. 2 illustrates an example network device/node.

FIG. 2 is a schematic block diagram of an example node/device 200 that may be used with one or more embodiments described herein, e.g., as any of the nodes shown in FIG. 1 above and/or server 150. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and/or an illustrative policy manager process 248, as described herein. Note that while policy manager process 248 is shown in centralized memory 240, alternative embodiments provide for the process to be specifically operated within the network interfaces 210, such as a component of a MAC layer (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways.

With the emergence of a myriad of applications, such as the smart grid, smart cities, building and industrial automation, and cars (e.g., that can interconnect millions of objects for sensing things like power quality, tire pressure, and temperature and that can actuate engines and lights), it has been of the utmost importance to devise new configuration techniques. In particular, the dividing line is blurred in many IoT implementations between the supporting devices for the network and the "objects" that communicate in the network. Said differently, both Information Technology (IT) administrators and Operational Technology (OT) administrators may need to define policies for an IoT network that affect the infrastructure of the network.

Configuring Contextually Aware IoT Policies

The techniques herein relate to an architecture and framework that provides network security while allowing anyone in an organization (e.g., a factory operator, etc.), to be able to securely manage and monitor access to the network and connected devices, without requiring knowledge of underlying networking or security policies. In some aspects, the techniques herein can be scaled for use in very large and remote IoT deployments, such as those typically found in utility, energy, or industrial environments. Notably, the techniques herein allow customers to tailor their rules and policies by customizing the policy definition language and workflows, to best suit their ecosystem and operator skill sets.

Illustratively, the techniques described herein may be performed by hardware, software, and/or firmware, such as in accordance with the policy management process 248, which may contain computer executable instructions executed by the processor 220 (or independent processor of interfaces 210) to perform functions relating to the techniques described herein. For example, the techniques herein may be treated as extensions to conventional protocols and as such, may be processed by similar components understood in the art that execute those protocols, accordingly.

Specifically, according to various embodiments, a device in a network loads a selectable lexicon. The device receives a command that uses the loaded lexicon. The device interprets the command using the loaded lexicon. The device generates a configuration for one or more network nodes in the network based on the interpreted command. The device causes the one or more network nodes to implement the configuration.

Figure 3:
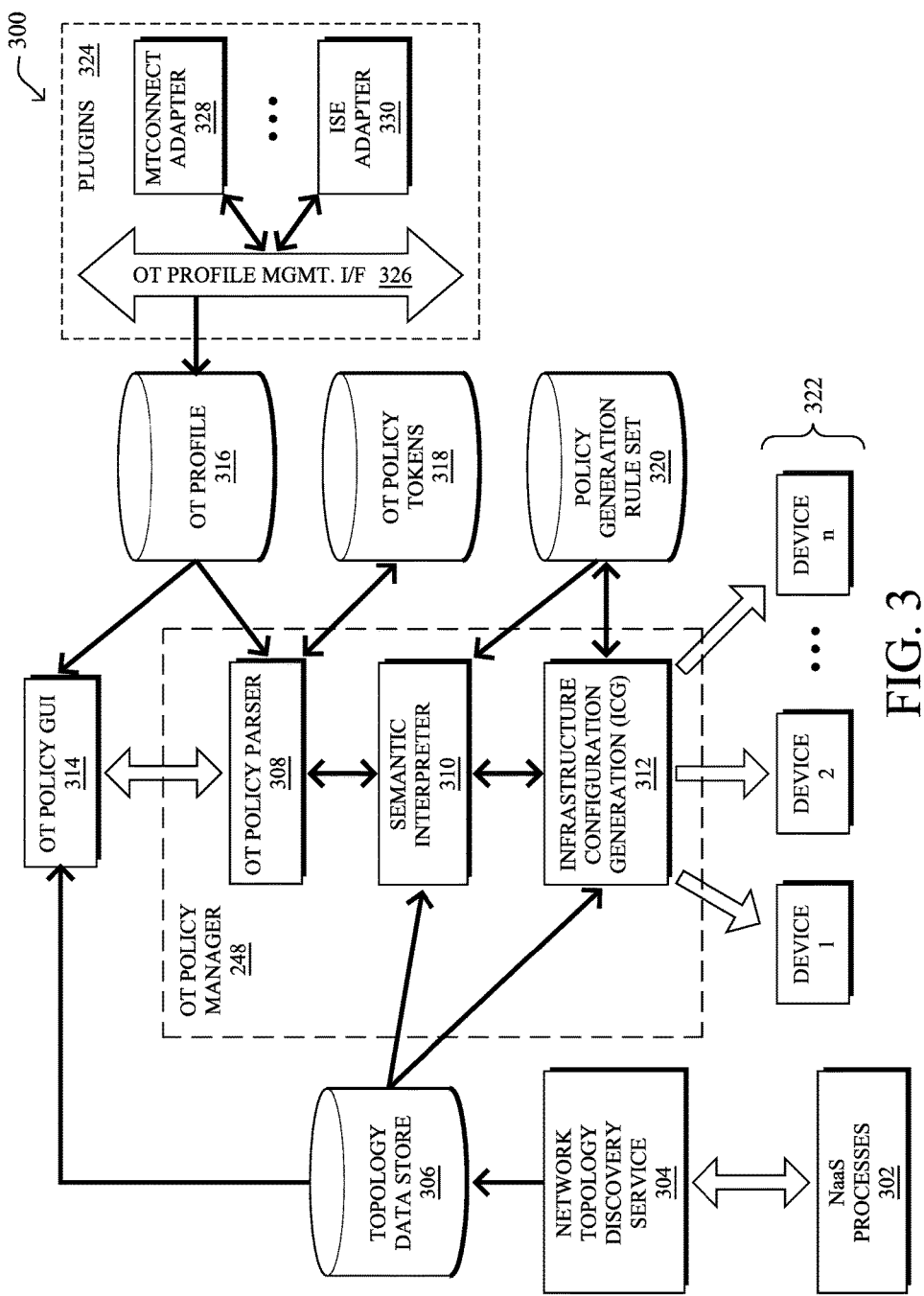
FIG. 3 illustrates an example architecture to provide a policy configuration service.

Operationally, the techniques herein leverage compiler technology, workflows, and tools to facilitate translation of a bounded OT language into network policy definitions and configurations. In particular, as shown in FIG. 3, an architecture 300 is shown to provide a policy configuration service in an LLN/IoT network, according to various embodiments. Such an "OT Policy" service may sit on any management plane (e.g., SDN controller, Prime, etc.) using the architecture shown in FIG. 3. Architecture 300 implements a contextually-based, high-level policy abstraction that be used to define network rules and policy configurations for a given deployment without requiring the administrator of such policies to have knowledge of the actual layout and configuration and management nuances of the overall system (e.g., the network topology, the endpoints or things, data resources, etc.).

As shown in FIG. 3, architecture 300 may use the appropriate application programming interfaces (APIs) and profiles to allow for the OT interface to be tailored and configured to a specific IoT discipline (e.g., a specialized type of manufacturing plant such as automotive, etc.) or other business context. Architecture 300 may also provide the appropriate APIs, profiles, database management, semantic interpretation, and infrastructure configuration generation, to allow for the OT specific rules and policy definitions to be interpreted and translated to the appropriate security and access control rules in the different network, security, and data resources. Architecture 300 may further define a number of functional blocks, interfaces, and dependencies on other services such as Network as a Sensor (NaaS) processes, to extract the deployment's network topology and current configuration. Architecture 300 may further include a graphical user interface (GUI) that provides management functionality, to allow an OT administrator to define the OT-based policies, in some embodiments.

In various embodiments, OT policy manager process 248 is the core of the "OT Policy" service and manages the underlying stores (e.g., in data structures 245), to allow for the implementation of dynamic, pluggable "OT languages" (labeled OT profile 316 in FIG. 3). Process 248 may also provide for the use of lexical tokens (labeled OT policy tokens 318), to parse an OT language/lexicon into tokens that can then be interpreted and correlated with the installed and configured networking infrastructure, to properly configure the network and security infrastructure. In some embodiments, OT policy manager 248 may obtain information regarding the network infrastructure by a network topology discovery service 304 that may be implemented as a sub-process of OT policy manager 248 or as a separate process in communication therewith. Lastly, architecture 300 may include a policy generation rule set data store 320 that is another dynamic store of information regarding the infrastructure elements and their configuration mappings (e.g., based on product, release, setting, etc.).

As shown, policy manager process 248 may include any or all of the following modules/sub-processes: an OT policy parser 308, a semantic interpreter 310, and an infrastructure configuration generator (ICG) 312, to compile an OT policy into rules that are applied to the network and security elements/nodes 322 depicted at the bottom of FIG. 3. Said differently, policy manager process 248 may send a policy (e.g., a device configuration to one or more of the elements/nodes 322 in the network. These software modules may rely on several databases or configuration files, to allow for the customization that is one of the core components of our invention. Such data stores (e.g., in data structures 245) may include, in various embodiments, a live network topology data store 306, OT profile store 316, OT policy lexical tokens store 318, and/or policy generation rule set data store 320. The data stores may be implemented as relational databases, object oriented databases, no-SQL databases, flat files, combinations of the like, or via other data storage mechanisms. Generally, an API may be used to abstract the underlying storage mechanism used to persist the stored data.

Network topology data store 306 may be operable to keep track of networking equipment in the customer network. In some embodiments, it can be populated automatically by leveraging discovery services from NaaS processes 302, which may gather information about the network from an application policy infrastructure controller APIC) enterprise module (APIC-EM), Sourcefire sensors, or other sources of topology information. In other embodiments, the information gathered about the network may be provided manually by a user (e.g., via GUI 314), or populated using both automatic discovery mechanisms and manual inputs.

OT profile 316 may define the various resources (e.g., users, devices, groups, etc. . . . ) and actions that are particular to the OT customer environment and expressed in a vocabulary known to the OT. This configuration file can also be populated from sources in the customer environment by taking information from sources such as MTConnect, Open Platform Communication (OPC), Factory Talk, an Identity Services Engine (ISE), and/or can be populated manually by a user (e.g., via GUI 314). A profile typically comprises information regarding what devices, groups/users/roles (for both human and M2M devices), network infra types, data resources, security elements, and actions are available for a particular domain. This information is useful to allow GUI 316 to render domain specific policy elements, thereby allowing the OT user to author OT specific policies that make sense for that domain, e.g. Auto Manufacturing Plant, Oil Rig, etc. OT policy parser 308 also leverages data store 316 to pull additional information, to augment the OT policy information provided via GUI 314, to generate the OT policy that conforms to the OT policy grammar, if necessary.

OT policy lexical token data store 318 may include tokens and other parsing information that is used by semantic interpreter 310 and policy parser 308, to translate the defined OT policy language into a meta-language that is used by ICG 312. Semantic interpreter 310 may also analyze the information in network topology data store 306, to determine which network elements need to be modified or configured to enforce a particular OT policy, in one embodiment. Along with the policy tokens in data store 318, data store 318 may also include indications as to whether a particular token appears in the policy generation rule set of data store 320 and whether a token is just part of the grammar. OT policy parser 308 may also use lexical token data store 318 to validate all the policy tokens it encounters while parsing the OT policy.

Policy generation rule set data store 320 may be used by ICG 312 to create and/or change the configuration and policy and rules in the various network and security elements 322 that implement and enforce the OT policy on the customer's network infrastructure. For example, elements 322 may include, but are not limited to, routers, switches, wireless access points (WAPs), firewalls, intrusion prevention systems (IPSs), intrusion detection systems (IDSs), combinations thereof, or the like.

In the implementation shown, ICG 312 may communicate directly with individual network elements 322 through drivers that translate a policy for individual network devices. In further embodiments, policy manager process 248 may be implemented as a software defined networking (SDN) application that may be more closely tied to a SDN manager, such as an APIC, Open Daylight (ODL) manager, or the like. In that case, it is natural that a device driver would be able to talk to the SDN infrastructure and control the infrastructure indirectly through the SDN controller instead of direct communication with individual devices 322.

The grammar that is generated can be used to configure complex tasks and policies on the individual devices 322 that are limited only by the capabilities of their drivers and the complexity of policy generation rule set data store 320.

During operation, both OT policy parser 308 and GUI 314 may be configured to understand the OT languages that are dynamically loaded through the "OT Profile" plug-in framework. That is, users and other IoT integrators may customize the vocabulary/lexicon to be exposed and used to define these policies. Said differently, the security lexicon used in commands received via GUI 314 may be selectable and configurable. For example, a different language/lexicon may be used for different users, industries, or the like. Note that the "language" in use must adhere to the OT service grammar structure so as to allow semantic interpreter 310 and ICG 312 to interpret and generate the appropriate network policies.

In some embodiments, the OT policy grammar may be an Extended-Backus-Naur Form (EBNF) grammar authored using the ANTLR framework. This framework may be used to generate parser 308 based on the grammar file passed to it (e.g., OT profile 316). The behavior of OT policy parser 308 could be controlled using the hooks provided by the grammar, whereby a listener interface can collect the parsed policy token elements and store it into a policy model. This listener interface may be passed to one of the framework methods to initiate the parsing and parse tree creation. The tokens obtained from parsing the OT policy may then be validated against OT policy lexical tokens data store 318 by OT policy parser 308. If parser 308 encounters an unrecognized token, it may return the error back to the user via GUI 314 and stop further processing of the policy command received from GUI 314.

As would be appreciated herein, OT policy parser 308 may expose the policy data model to semantic interpreter 310. In some embodiments, this module leverages policy generation rule set data store 320, to generate an intermediate representation of the OT policy. Policy generation rule set data store 320 may also provide lexical token rules for every token that appears in the OT policy.

Semantic interpreter 310 may rely on the token rules from policy generation rule set data store 320 to build the intermediate representation of the policy by fetching the appropriate token rule based on the token in the command received via GUI 314 and then using the token type. Doing so allows semantic interpreter 310 to obtain the structure of the intermediate representation and perform the appropriate value substitution to create the intermediate representation of the OT policy. This intermediate representation is then passed to ICG 312 for further processing.

In some embodiments, the intermediate representation of the policy generated by semantic interpreter 310 may use a command-like structure built from the policy generation rule set. In turn, ICG 312 may use the intermediate representation of the policy to generate device specific policies. An example of an intermediate representation of a higher level OT policy may be as follows:

Permit group "xxx_contractor" resource "robot" ["read"]. Such a command may permit a particular user group, "xxx_contractor," to read data from robot resources.

ICG 312 may be configured to parse the intermediate representation of the OT policy passed by semantic interpreter 310 by leveraging the policy generation rule set in data store 320. In addition to parsing, this module may also be operable to invoke the right "device driver" based on the rules, to generate the actual device configurations/policies and then push the appropriate driver(s) to the respective network security element devices 322.

An example of the API between semantic interpreter 310 and ICG 312 is as follows. First, ICG 312 will take commands as text input following a fairly rigid structure, but the actual commands accepted and how they are interpreted and acted upon is flexible and will be driven by the ICG configuration database (e.g., data stores 316-320). Each command may be based on an action phrase, in some embodiments. Generally, action phrases are actions that ICG 312 will perform based on the rules in its configuration database. The action phrases are built up from rules described below, but are essentially an action followed by a number of nouns which can be refined using conditional attributes. Valid action phrases can be customized to suit any given environment, though a fairly thorough and complete standard configuration database may be distributed with ICG 312.

In general, ICG commands are based upon parsing tokens defined in the ICG configuration database. There are four basic token types, according to various embodiments:
   Actions
   Nouns
   Attributes
   Conditions In some embodiments, any or all of the following command parsing rules may be implemented in the architecture:
1. All commands are built from action phrases
2. Action phrases have a token and any number of nouns (typically 1 or 2)
3. Nouns have a type token, identifier, and an optional attribute phrase
4. Attribute phrases are enclosed in square brackets: '[' and ']'
5. Attributes are tokens, which may have additional conditions associated with them
6. Attribute phrases may have one or more attributes combined by Boolean logic with keywords "AND" and "OR"
7. Attributes combined by Boolean logic are processed left to right, but may be grouped by enclosing them in parenthesis: '(' and ')'
8. Conditions may be required by an attribute and would be used to further clarify the attribute or restrict it.
9. All values that are not tokens must be enclosed in double quotes """.

Example initial values of tokens that may be used by the API are described in the table below, in various embodiments. However the actual tokens and rules associated with them may be customized as desired.

TABLE 1

| Token | Type | Use | Description |
|---|---|---|---|
| create_group | action | v s | create subject group |
| remove_group | action | v s | remove subject group |
| add | action | v s o | add subject user to a group |
| remove | action | v s o | remove subject user from group |
| permit | action | v s o | permit subject u/g access to object |
| block | action | v s o | block subject u/g access to object |
| permit_all | action | v s | permit all access to subject object |
| block_all | action | v s | block all access to subject object |
| group | noun | group "id" | group with name "id" |
| user | noun | user "id" | user with name "id" |
| resource | noun | resource "id" | resource with name "id" |
| remote | attribute | remote | user/group is remote |
| wired | attribute | wired | hard wired connection |
| wireless | attribute | wireless | WiFi based access |
| read | attribute | read | read command on resource |
| write | attribute | write | write command on resource |
| time | attribute | time:cond | time based restriction on resources |
| tolerance | attribute | tolerance: cond | tolerance restriction on resources |
| range | cond | Range "min" "max" | range conditional for attributes |
| exclude | cond | exclude "min" "max" | anti-range (exclusion) for attributes |
| less_than | cond | less_than "value" | less than conditional for attributes |

TABLE 1-continued

| Token | Type | Use | Description |
|---|---|---|---|
| greater than | cond | greater_than "value" | greater than conditional for attributes |
| equals | cond | equals "value" | equality conditional for attributes |
| is_not | cond | is_not "value" | inequality conditional for attributes |

Example attribute phrases are as follows:
1. [(remote OR wired) AND time: exclude "0900" "1700" ]
2. [write AND tolerance: less than "90" ]

Example commands are as follows:
   create_group group "restricted"
   add user "alice" group "restricted"
   permit group "restricted" resource "robot" [read]
   permit_all resource "water pump" [tolerance:range "100" "200" ]

Figure 4:
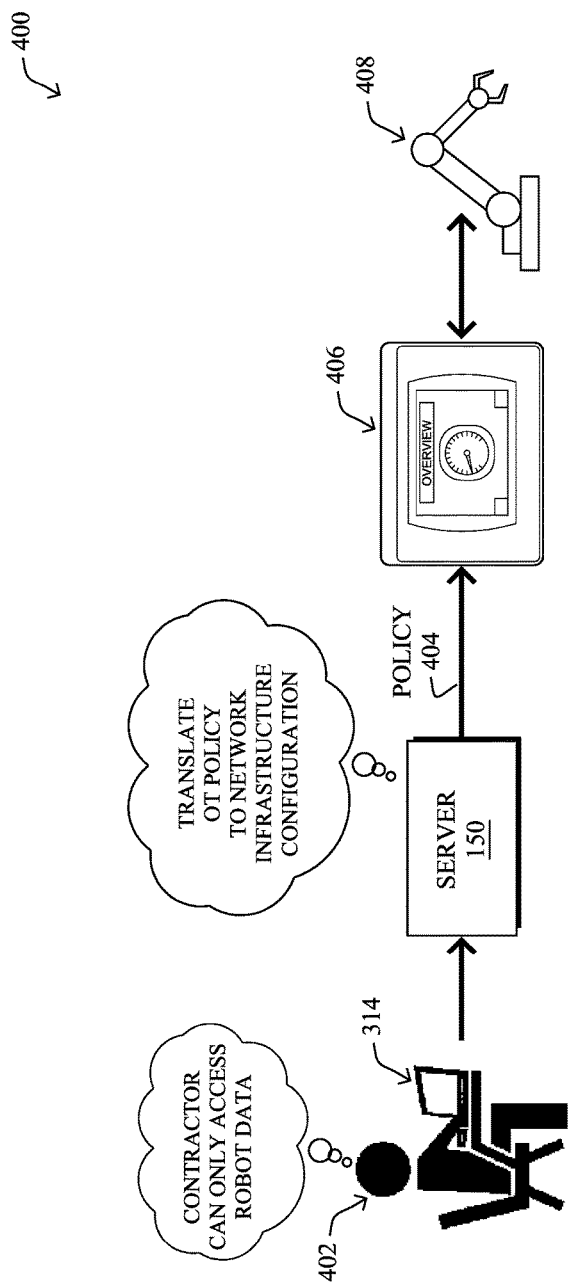
FIG. 4 illustrates an example translation of an OT policy into an IT policy.

Referring now to FIG. 4, an example 400 is shown illustrating the translation of an OT policy into an IT policy, according to some embodiments. As shown, assume that OT administrator 402 wishes to implement a policy whereby an authorized user will be able to access information only from a deployed robot 408 in read-only mode. GUI 314 may be operable to allow OT administrator 402 to view, create, edit, validate, disable, and delete the corresponding OT policy for the user using an OT-based lexicon. For example, OT administrator 402 may enter in a command that limits a contractor's access to deployed robots as read-only and/or to robots in a certain location (e.g., factory warehouse A, etc.). In turn, the OT policy manager may translate the OT policy into a corresponding network configuration/policy 404 and distribute it to any of affected devices. For example, policy 404 may be pushed to device 406 that interfaces with robot 408, thereby preventing the contractor from accessing robots in other locations, limiting the contractor's access to robot 408, etc.

Figure 5:
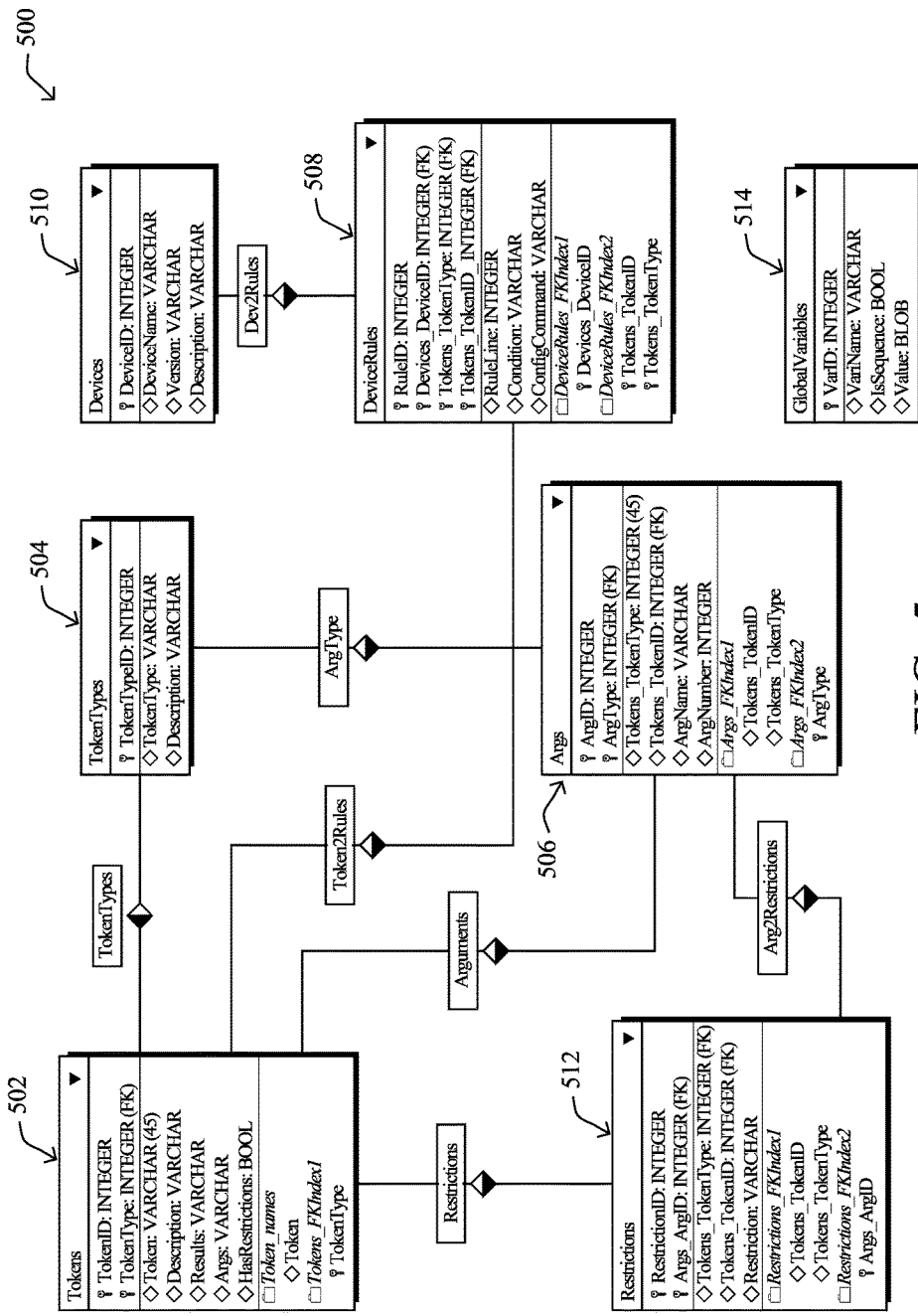
FIG. 5 illustrates an example relational database schema.
Figure 6:
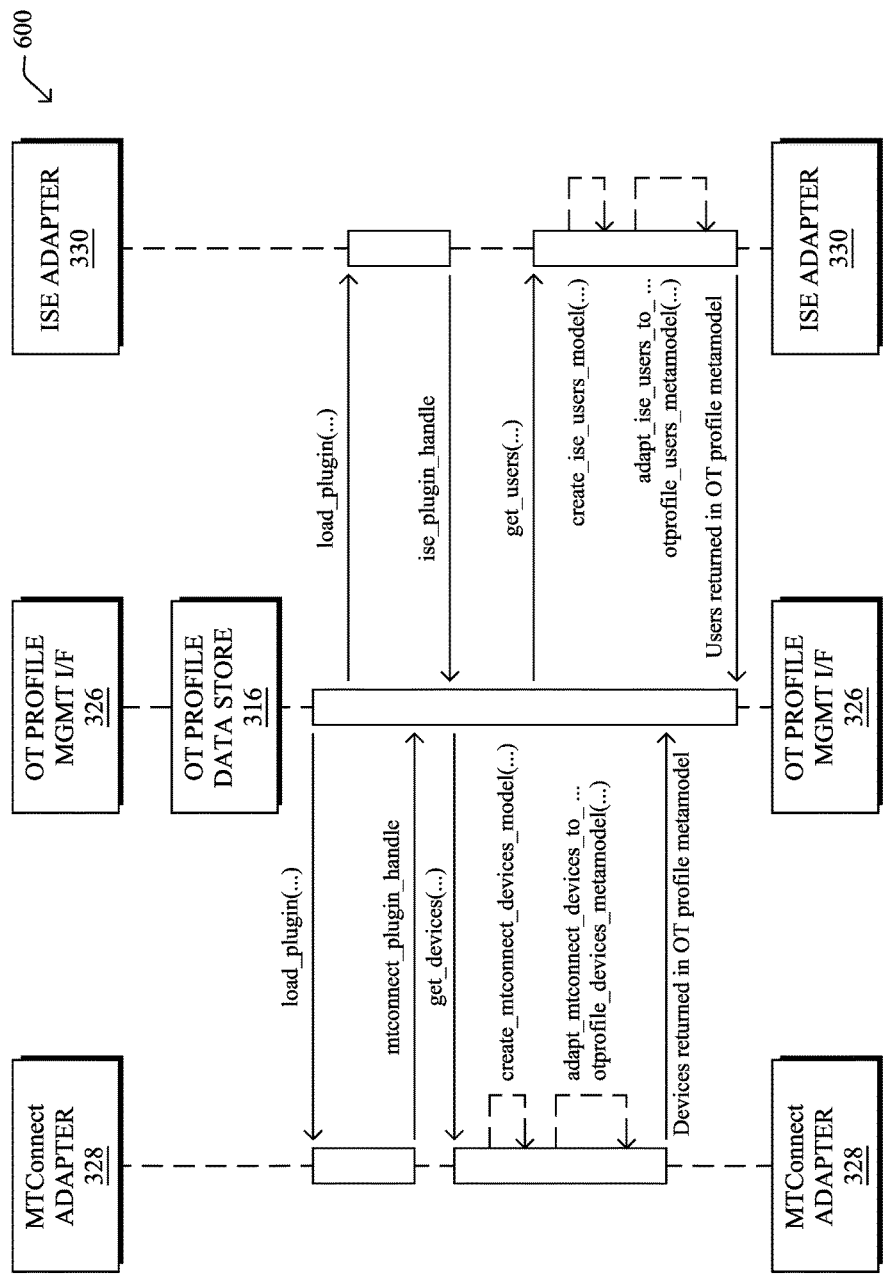
FIG. 6 illustrates an example sequence diagram of message passing using the architecture of FIG. 3.

Referring now to FIG. 5, an example relational database schema 500 is shown, according to some embodiments. As shown, the database may include the following tables: GlobalVariables table 514, TokenTypes table 508, Devices table 510, Tokens table 502, Args (Arguments) table 506, DeviceRules table 508, and Restrictions table 512. The implemented database schema 500 may have any or all of the following properties:
   TokenTypes may be normalized by the TokenTypes table 504 and it will have only 4 entries: "Action", "Noun", "Attribute", and "Condition".
   Every token will get an entry in the Tokens table 502, and must be a valid token type according to TokenTypes table 504.
   The arguments which were the extra words in the token section heading ("subject", "object", etc. . . . ) will have a corresponding entry in the Args table 506.
   If any argument has a restriction (e.g., "subject" can only have the "remote" attribute, etc.), that will be contained in the Restrictions table 512.
   Devices (and information about their drivers) will be added to Devices table 510.
   The rules (e.g., send driver message X to IPS device Y) may be stored in DeviceRules table 508.
   Rules in DeviceRules table 508 may be ordered and have conditions associated with them, as opposed to grammar based conditions such as a tolerance between the ranges of 100-200. Rather, the entries in this table may be conditions on executing the rule (e.g., "if TrustSec, execute rule Y," etc.). Generally, this grammar may be used to check variable state, device versions, and existence of a device.

In some embodiments, there may be a special Device for ICG internal commands such as setting variables and other internal state rules. Its rules will be in Device-Rules table 508 as well. Potential commands would also be ladder logic rules that control the execution of the rest of the rule set for example if a certain condition is true stop executing any more rules for this token.

Global Variables table 514 holds configuration information like creating state variables for ICG 312 and internal sequence numbers.

The editing and maintenance of the database shown may be performed using a customized tool (e.g., via GUI 314 described above, etc.) or may be performed using an existing database editor.

Updates for drivers of and devices may be added and provided by a simple SQL script that adds the appropriate new rows to Devices table 510 and DeviceRules table 508. Devices and their rules can also be removed by a simple script that deletes rows from tables 508-510 by device ID.

The API calling ICG 312 may be implemented in any number of different ways. In one embodiment, it will be a simple UNIX shell call to ICG 312 with the arguments being a single action phrase. In other embodiments, this API may be a REST API associated with an ICG server daemon. Performance can also be boosted by having a single queue for requests which then gets served out to ICG helper processes. State information can be kept in a relational database to allow for concurrent operation, in further embodiments.

Referring now to FIG. 5, an example sequence diagram of message passing using the architecture of FIG. 3 is shown, according to various embodiments. In some embodiments, the architecture herein may use a plugin framework, to allow different OT languages to be plugged into OT profile data store 316. Example pluggable frameworks include, but are not limited to, the Java Simple Pluggable Framework (JSPF), OSGi-based frameworks (e.g., Eclipse Equinox, Apache Felix, etc.), and the like.

In some embodiments, the OT Profile may be exposed using an OT profile plugin management interface (I/F) 326, as shown in FIGS. 3 and 5. This plugin may be operable to the convert an OT data model to a standard OT profile data model (e.g., in OT profile data store 316). Such a plugin mechanism may implement the interface shown, allowing for message passing between an MTConnect adapter 328 and an Identity Services Engine (ISE) adapter 330. MTConnect is an industrial standard to obtain information regarding a process from controlled tooling. During operation, interface 326 may request a metadata model for the tooling devices via MTConnect adapter 328, as adapted to that of the OT profile. Similarly, ISE is a product available from Cisco Systems, Inc., that allows the configuration of network security policies. As shown, interface 326 may retrieve a metadata model for the user profiles in the ISE adapted to the model used in OT profile 316.

Figure 7:
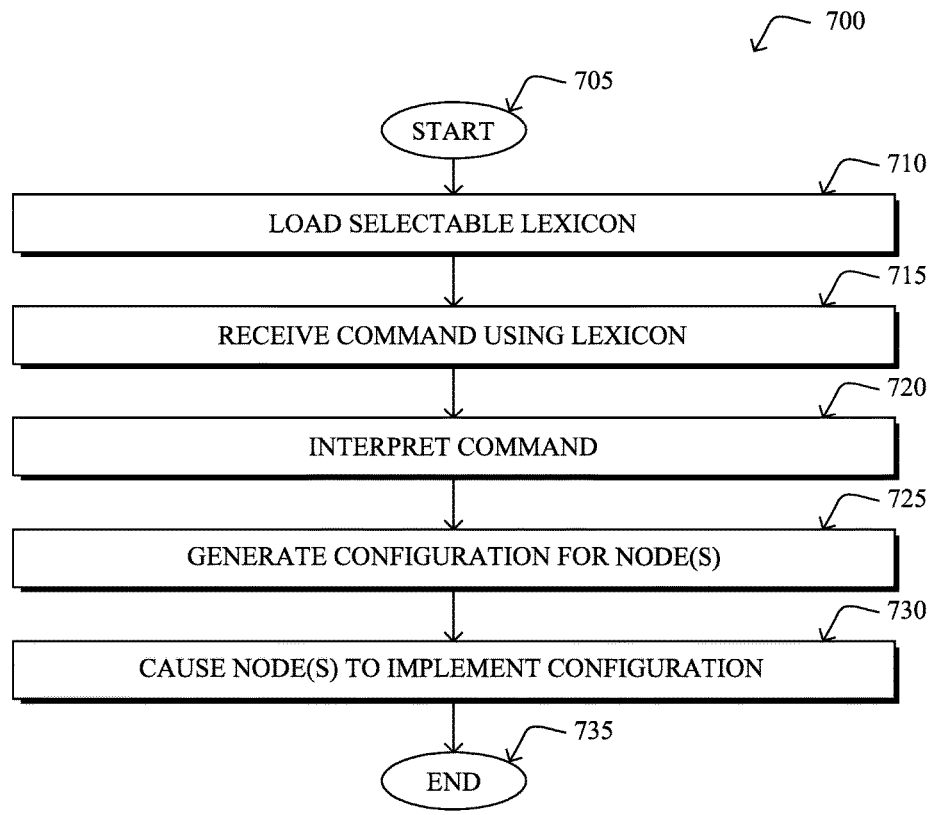
FIG. 7 illustrates an example simplified procedure for configuring network policies.

Referring now to FIG. 7, an example simplified procedure is shown for configuring network policies, according to various embodiments. Generally, procedure 700 may be performed by a device in a network (e.g., device 200, etc.) by executing stored instructions (e.g., policy manager process 248). Procedure 700 may begin at step 705 and continue on to step 710 where, as described in greater detail above, the device may load a selectable lexicon. In particular, the device may maintain a database or other data storage mechanism that comprises OT lexical tokens, as part of an OT-based language. For example, the language/lexicon may include tokens related to network security or other network configurations. Such a lexicon may also be selectable in that different OT lexicons may be configured, e.g., across different industries, user roles, etc.

At step 715, as detailed above, the device may receive a command that uses the loaded lexicon. In particular, the device may receive a command that includes one or more of the loaded tokens of the OT lexicon, e.g., via a GUI or other user interface. For example, the received command may be a command line-based instruction to add a particular user to the access list for a certain device in the network. In another example, the received command may be an instruction to prioritize certain network traffic over others (e.g., from a certain user, from a specific application, etc.).

At step 720, the device may interpret the received command, as described in greater detail above. In some embodiments, the device may translate the received command from the lexicon used into an intermediate representation of the received command. Such an intermediate representation may be of a more universal nature than that of the OT lexicon, allowing any number of different OT lexicons to be used. Further, the device may interpret the received command by mapping any lexical tokens in the command to devices in the network. For example, in some embodiments, the device may use a topology discovery service to identify the nodes in the network and their capabilities. In turn, the device may determine whether the received command relates to any of these devices and, if so, how.

At step 725, as detailed above, the device may generate a configuration for one or more nodes in the network, based on the interpreted command. Such a policy may be controlled, in part, by policy generation rules that control the applicability of any given command to any given device. The device may use the stored policy generation rules to determine which nodes/devices in the network are associated with a given command and the appropriate configurations for the nodes, based on the interpreted command. For example, assume that the command indicates that a particular user is to be restricted to only communicating with a certain type of equipment (e.g., a sensor, an actuator, etc.) and/or located within a certain area. In such a case, the device may the corresponding configuration(s) for the one or more nodes in the network responsible for the equipment that enact the restriction. Notably, the configuration, which may be a security policy or the like, may be node-specific and different from that of the command received in step 715.

At step 730, the device may cause the one or more network nodes to implement the generated configuration. In some embodiments, the device may send the configuration settings, etc. for a policy directly to the one or more nodes. For example, the device may send the generated policy to the one or more nodes via a REST-based API or the like. In other embodiments, the device may send the policy/configuration to another, intermediary device, to facilitate implementation of the configuration. Procedure 700 then ends at step 735.

The techniques described herein, therefore, allow an OT administrator/author to generate a networking policy using his or her own lexicon and context. In other words, the techniques herein provide for the use of a higher-level policy language/model which is defined using constructs relevant to the specific context (e.g. auto manufacturing, Oil & Gas, etc.). This higher-level OT policy will materialize into a relevant, secure network infrastructure policy (IT policy) in the underlying security and networking infrastructure elements. The synthesized and derived policy is translated into specific rules that are sent to various network security devices. Ultimately, the techniques may also be operable to change policy rules on the fly, to make the real time policy changes seamless and secure.

While there have been shown and described illustrative embodiments that provide for the configuration of an LLN/IoT network using OT-based commands, it is to be understood that various other adaptations and modifications may be made within the spirit and scope of the embodiments herein. For example, the embodiments have been shown and described herein with relation to certain networks configurations. However, the embodiments in their broader sense are not as limited, and may, in fact, be used with other types of shared-media networks and/or protocols (e.g., wireless). In addition, while certain protocols are shown, other suitable protocols may be used, accordingly. The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
loading, by a device in a network, a selectable lexicon associated with an operational technology (OT) policy manager;
receiving, at the device, a command that uses the loaded lexicon and specifies an OT policy;
interpreting, by the device, the command using the loaded lexicon by translating the received command from the loaded lexicon into an intermediate representation of the receive command that maps one or more tokens from the selectable lexicon to a network infrastructure;
dynamically generating, by the device, a network configuration for one or more network nodes in the network based on the intermediate representation of the received command and a topology of the one or more network nodes in the network obtained by a network topology discovery service, wherein the generated network configuration translates, via a compiler, the OT policy into network policy definitions and configurations to be applied dynamically to the network; and
sending, by the device, the network configuration to the one or more network nodes via an application programming interface (API) to cause the one or more network nodes to implement the generated network configuration.

2. The method as in claim 1, wherein translating includes:
parsing, by the device, the received command to identify a lexical token in the command; and
comparing, by the device, the identified lexical token to a set of lexical tokens in the loaded lexicon, to determine whether the received command is valid.

3. The method as in claim 1, further comprising:
retrieving, by the device, network topology information regarding the network, wherein the network topology information identifies the one or more network nodes and a configuration of the one or more network nodes.

4. The method as in claim 3, wherein generating the network configuration for the one or more network nodes comprises:
mapping, by the device, the interpreted command to the network configuration of the one or more network nodes according to a generation ruleset.

5. The method as in claim 1, wherein the selectable lexicon is a loadable plug-in.

6. The method as in claim 1, wherein the implemented network configuration controls access to a sensor or an actuator.

7. The method as in claim 6, wherein the network configuration controls access to the sensor or the actuator based on a location of a requesting device.

8. The method as in claim 1, wherein the one or more network nodes comprise at least one of: a router, a firewall, a programmable logic controller, or an intrusion protection system.

9. An apparatus, comprising:
one or more network interfaces to communicate with a network;
a processor coupled to the network interfaces and configured to execute one or more processes; and
a memory configured to store a process executable by the processor, the process when executed configured to:
load a selectable lexicon associated with an operational technology (OT) policy manager;
receive a command that uses the loaded lexicon and specifies an OT policy;
interpret the command using the loaded lexicon by translating the received command from the loaded lexicon into an intermediate representation of the receive command that maps one or more tokens from the selectable lexicon to a network infrastructure;
dynamically generate a network configuration for one or more network nodes in the network based on the intermediate representation of the received command and a topology of the one or more network nodes in the network obtained by a network topology discovery service, wherein the generated network configuration translates, via a compiler, the OT policy into network policy definitions and configurations to be applied dynamically to the network; and
send the network configuration to the one or more network nodes via an application programming interface (API) the one or more network nodes to implement the network configuration.

10. The apparatus as in claim 9, wherein translating includes:
parsing the received command to identify a lexical token in the command; and
comparing the identified lexical token to a set of lexical tokens in the loaded lexicon, to determine whether the received command is valid.

11. The apparatus as in claim 9, wherein the process when executed is further configured to:
retrieve network topology information regarding the network, wherein the network topology information identifies the one or more network nodes and a current configuration of the one or more network nodes.

12. The method as in claim 11, wherein generating the network configuration for the one or more network nodes comprises:

mapping the interpreted command to the network configuration of the one or more network nodes according to a policy generation ruleset.

13. The apparatus as in claim 9, wherein the selectable lexicon is a loadable plug-in.

14. The apparatus as in claim 9, wherein the network configuration controls access to a sensor or an actuator.

15. The apparatus as in claim 14, wherein the network configuration controls access to the sensor or the actuator based on a location of a requesting device.

16. The apparatus as in claim 9, wherein the one or more network nodes comprise at least one of: a router, a firewall, a programmable logic controller, or an intrusion protection system.

17. A tangible, non-transitory, computer-readable medium storing program instructions that, when executed by a device in a network, causes the device to:
  load a selectable lexicon associated with an operational technology (OT) policy manager;
  receive a command that uses the loaded lexicon and specifies an OT policy;
  interpret the command using the loaded lexicon by translating the received command from the loaded lexicon into an intermediate representation of the receive command that maps one or more tokens from the selectable lexicon to a network infrastructure;
  dynamically generate a network configuration for one or more network nodes in the network based on the intermediate representation of the received command and a topology of the one or more network nodes in the network obtained by a network topology discovery service, wherein the generated network configuration translates, via a compiler, the OT policy into network policy definitions and configurations to be applied dynamically to the network; and
  send the network configuration to the one or more network nodes via an application programming interface (API) the one or more network nodes to implement the network configuration.

18. The computer-readable medium as in claim 17, wherein translating includes:
  parse the received command to identify a lexical token in the command; and
  compare the identified lexical token to a set of lexical tokens in the loaded lexicon, to determine whether the received command is valid.

\* \* \* \* \*

UNITED STATES PATENT AND TRADEMARK OFFICE
CERTIFICATE OF CORRECTION

PATENT NO. : 10,320,613 B1
APPLICATION NO. : 15/057283
DATED : June 11, 2019
INVENTOR(S) : Nancy Cam-Winget et al.

Page 1 of 1

It is certified that error appears in the above-identified patent and that said Letters Patent is hereby corrected as shown below:

In the Specification

In Column 1, Line 27, should read:
Changing environmental conditions may also affect Signed and Sealed this
Eleventh Day of February, 2020

Andrei Iancu
*Director of the United States Patent and Trademark Office*